United States Patent [19]

Karayannis et al.

[11] 4,258,168
[45] Mar. 24, 1981

[54] POLYMERIZATION PROCESS

[75] Inventors: Nicholas M. Karayannis, Naperville; Sam S. Lee, Hoffman Estates, both of Ill.

[73] Assignee: Standard Oil Company (Indiana), Chicago, Ill.

[21] Appl. No.: 696,812

[22] Filed: Jun. 16, 1976

[51] Int. Cl.$^3$ ............................ C08F 4/66; C08F 10/06
[52] U.S. Cl. ................................. 526/139; 252/429 B; 526/128; 526/132; 526/136; 526/138; 526/141; 526/142; 526/351
[58] Field of Search ...................... 526/139, 142, 132

[56] References Cited

U.S. PATENT DOCUMENTS

| | | | |
|---|---|---|---|
| 2,956,991 | 10/1960 | Coover et al. | 526/142 |
| 3,149,097 | 9/1964 | Coover et al. | 526/142 |
| 3,149,098 | 9/1964 | Price et al. | 526/142 |
| 3,269,996 | 8/1966 | Langer | 526/139 |
| 3,278,643 | 10/1966 | Achon | 526/139 |
| 3,502,634 | 3/1970 | Stedefeder et al. | 526/139 |
| 3,940,345 | 2/1976 | Caunt | 526/139 |
| 3,984,350 | 10/1976 | Karagannis et al. | 526/139 |

FOREIGN PATENT DOCUMENTS 42-22052 10/1967 Japan.
44-14353 6/1969 Japan.

*Primary Examiner*—Edward J. Smith
*Attorney, Agent, or Firm*—Wallace L. Oliver; William T. McClain; William H. Magidson

[57] ABSTRACT

In an alpha-olefin polymerization process using a transition metal halide-aluminum alkyl catalyst system, addition of minor, effective amounts of alkyl orthoformates, thiophosphates and borates decreases the amount of low molecular weight or amorphous polymer produced.

8 Claims, No Drawings

POLYMERIZATION PROCESS

BACKGROUND OF THE INVENTION

This invention relates to alpha-olefin polymerization processes and particularly relates to catalyst systems in such processes which produce commercially acceptable levels of low molecular weight and, especially, amorphous polymers as determined by the amount of polymerized product which is soluble in n-hexane.

The polymerization of alpha-olefins to normally-solid, substantially crystalline polymers using heterogeneous catalysts comprising transition metal halides and aluminum alkyls now is well-known in the art. However, there is a continuing need in the industry for catalyst systems which have a high yield, as measured by the grams of crystalline product per gram of transition metal halide consumed, while producing a minimum amount of n-hexane-soluble polymer. In a slurry polymerization process which uses a hydrocarbon solvent, such as n-hexane, amorphous and low molecular weight polymer accumulates in the solvent which necessitates extensive solvent purification procedures. Since the economic value of such n-hexane-soluble polymer is lower than normally-solid, substantially crystalline product, the overall process becomes less efficient as the amount of hexane-soluble product increases.

In a solventless, liquid-phase bulk polymerization or in a vapor phase process, the production of polymers which contain more than about 2% of n-hexane-soluble product requires a separate extraction procedure to produce commercially acceptable products and makes these inherently efficient processes uneconomical. Therefore, polymerization processes which produce low amounts of n-hexane-soluble polymer while not adversely affecting polymerization yield are in demand.

Various catalyst components in addition to transition metal halides and aluminum alkyls have been disclosed to minimize n-hexane-soluble products in alpha-olefin polymerization. Such additional components include aliphatic amines, tetraorganosilyl compounds such as tetraalkyl-,tetraaryl- and tetraalkoxysilanes, sterically hindered cyclic amines, amine N-oxides and organotin sulfides. One such system is described in U.S. Pat. No. 3,950,268 incorporated herein by reference.

It is an object of this invention to discover catalyst additives which decrease n-hexane-soluble products while maintaining reasonable polymerization activity.

SUMMARY OF THE INVENTION

In a process to polymerize alpha-olefins to normally-solid, substantially crystalline polymer utilizing a catalyst comprising a transition metal halide and an aluminum alkyl, this invention comprises adding to such catalyst effective amounts of an additive selected from the group consisting of alkyl esters of orthoformic, thiophosphoric and boric acids wherein the alkyl groups are aliphatic or aromatic hydrocarbons containing from 1 to about 12 carbon atoms, whereby the amount of n-hexane-soluble polymeric product is decreased.

BRIEF DESCRIPTION OF THE INVENTION

In an alpha-olefin polymerization process using a transition metal halide-aluminum alkyl catalyst system, the addition to such system of minor amounts of alkylorthoformates, alkylthiophosphates and alkylborates decreases the amount of n-hexane-soluble products formed while maintaining the polymerization activity.

Suitable catalyst additives of this invention include alkyl and substituted alkyl esters of orthoformic, thiophosphoric and boric acid. Suitable alkyls include aliphatic and aromatic hydrocarbon and substituted hydrocarbon radicals containing from 1 to about 12 carbon atoms such as methyl, ethyl, propyl, isopropyl, n-butyl, isobutyl, s-butyl, isooctyl, decyl, dodecyl, benzyl, tolyl and the like. In addition, compatible functionalities such as halogen and nitro groups can be present. Specific compounds include trimethyl orthoformate, triethyl orthoformate, tri-n-butyl orthoformate, triethyl thiophosphate, tri-n-butyl thiophosphate, tri-isooctyl thiophosphate, tri-p-tolyl thiophosphate and tri-n-butyl borate.

The exact amount of the additives useful in this invention varies depending upon the precise make-up of the other catalyst components and upon the polymerization conditions. Typically effective amounts range from about one-tenth mol percent to about 50 mol percent and preferably about 5 to 30 mol percent of the transition metal halide.

The alkyl esters of this invention can be utilized in conjunction with effective catalyst coadditives such as hydrogen sulfide, sulfur dioxide, alkyl silicates, orthosilicate esters, Lewis bases such as phosphines, phosphites, phosphates, aromatic amines, amine oxides, tertiary aliphatic amines, and ethers or an organometallic chalcogenide such as a bis(trialkyltin) sulfide. These additional additives can be present in minor amounts ranging from about one-tenth to 30 mol percent and preferably about 5 to 20 mol percent of the transition metal halide in the catalyst system.

The catalyst system described in this invention contains (a) an alkylaluminum compound and (b) a transition metal halide in addition to minor amounts of other additives.

Useful aluminum alkyls include trialkylaluminum, dialkylaluminum halides and mixtures thereof. Also catalytic effective amounts of such trialkylaluminums, dialkylaluminum halides and their mixtures can be used in conjunction with aluminum alkyl dihalides. An alkylaluminum halide-aluminum alkyldihalide mixture commonly is called alkylaluminum sesquihalide. Useful halides include bromides and chlorides and useful alkyl radicals contain from two to about six carbon atoms. The preferable halide is chloride and the preferable alkyl radical is ethyl. Diethylaluminum chloride (DEAC) or a mixture of DEAC and triethylaluminum (TEA) is most preferable. In a trialkylaluminum-dialkylaluminum halide mixture, the preferred amount of trialkylaluminum is about 20 to 50 mol percent. In a trialkylaluminum-alkylaluminum dihalide mixture, the preferred amount is about 30 to 70 mol percent and most preferably about 40 to 60 mol percent.

The transition metal halides useful as a component in the catalyst system of this invention are halides of transition metals of Groups IVB, VB and VIB of the Periodic Table. Preferably, the transition metal halide is a chloride of titanium, vanadium, chromium, molybdenum or zirconium. Most preferably, titanium trichloride and especially activated titanium trichloride is used. Titanium trichloride can be activated to a high degree of polymerization activity by chemical or physical means, such as by incorporating aluminum chloride in the titanium trichloride catalyst matrix or by comminuting the titanium trichloride catalyst component. One useful activated titanium trichloride has an approximate stoichimetric formula of TiCl$_3$·⅓AlCl$_3$ and has been mechanically activated. Further, titanium trichloride can be activated by forming adducts with Lewis bases such as ethers or by supporting the titanium trichloride on a catalytically inert substance such as a metal oxide or salt.

The molar ratio of transition metal halide to aluminum alkyl in a catalyst system can range from about one-tenth to about 10 and typically is about 1 to 3. The amount of catalyst in a polymerization depends on the reactor size and type and on the amount and type of olefin monomer and is known to the skilled artisan.

Since the catalyst systems used in this invention are sensitive to oxygen and moisture, suitable precautions should be taken during catalyst preparation, transfer and use.

The polymerization process of this invention can be utilized at pressures ranging from atmospheric to about 20,000 p.s.i.g. and preferably from about 30 to 1000 p.s.i.g.

The polymerization time depends on the process utilized. In batch processes the polymerization contact time usually is about one-half to several hours and typically is one to four hours in autoclave processes. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The liquid organic solvents used in the slurry polymerization technique include aliphatic alkanes and cycloalkanes such as pentane, hexane, heptane or cyclohexane; a hydrogenated aromatic compound such as tetrahydronaphthalene or decahydronaphthalene; a high molecular weight liquid paraffin or mixtures of paraffins which are liquid at the reaction temperature; an aromatic hydrocarbon such as benzene, toluene or xylene; or a haloaromatic compound such as chlorobenzene, chloronaphthalene or o-dichlorobenzene. Other suitable solvent include ethylbenzene, isopropylbenzene, ethyltoluene, n-propylbenzene, diethylbenzenes, mono- and di-alkylnaphthalenes, n-pentane, n-octane, isooctane and methyl cyclohexane. Preferably, liquid hydrocarbons are used; most preferably, hexane is the polymerization medium. Although the nature of the solvent can be varied considerably, the solvent should be liquid under the reaction conditions and should be relatively inert. Advantageously, the solvent used can be purified prior to use by distillation or by reaction with an aluminum alkyl to remove impurities.

The polymerization temperature depends upon the specific catalyst system used and can range from below about 0° to above about 120° C. However, at temperatures below about 0° C. the polymerization rate slows and reactor residence times becomes unreasonably long, while at temperatures above about 120° C. the polymerization rate is too high which results in excessive amounts of hexane-soluble products. Preferably, the temperature ranges from about 2° C. to about 95° C. and most preferably from about 50° C. to about 80° C.

This invention is most useful in polymerizing propylene to a normally solid, substantially crystalline polymer, although propylene also can be polymerized with ethylene or other alpha-olefins to form random, pureblock, terminal block and multisegment copolymers. Additionally, other alpha-olefins such as ethylene or styrene can be polymerized by this invention. Generally, polymers and copolymers of alpha-olefins with a structure of CH$_2$=CHR where R is either hydrogen or an aliphatic, cycloaliphatic or aromatic radical containing up to about eight carbon atoms can be produced using this invention.

The normally solid poly(alpha-olefins) prepared according to this invention have molecular weights ranging from about 50,000 to 5,000,000 and typically range from about 200,000 to 2,000,000. The molecular weights of such poly(alpha-olefins) can be controlled by methods known to the art, such as by polymerizing in the presence of dialkyl zinc compounds or, preferably, in the presence of hydrogen in amount determined by the molecular weight distribution desired.

This invention is demonstrated but not limited by the following Examples.

EXAMPLES I-IX

In a dry nitrogen atmosphere, 0.2 grams of aluminum activated titanium trichloride (AA TiCl$_3$), 3.2 milliliters of DEAC (25 wt.% in hexane) and 0.05 to 0.06 milliliters of additive were placed in a pressure vessel equipped with a gas inlet tube, which contained 190 milliliters of n-hexane. After the vessel was capped, polymerization was initiated by feeding propylene into the vessel through the inlet tube. A pressure of 40 p.s.i.g. and a temperature of 70° C. was maintained for four hours. After the resulting product was deactivated by adding a mixture of 50 milliliters of n-hexane and 10 milliliters of methanol and stirring for one hour, the product was filtered and washed with about 100 milliliters of n-hexane and enough methanol to remove any catalyst residues. The insoluble, filtered product was dried for one hour at 90° C. and weighed. This weight divided by the weight of AA TiCl$_3$ used in the reaction is the Crystalline Yield. The combined filtrates were evaporated to dryness and the resulting Hexane Soluble product weighed.

A series of polymerization were made using catalyst additives of this invention; the results are shown in TABLE I.

TABLE I

| Example (Run) | Additive Type | Additive Amount (ml) | Crystalline Yield (g/g) TiCl$_3$ | Hexane Solubles (%) |
|---|---|---|---|---|
| (A) | none | — | 236.8 | 10.57 |
| I | trimethyl orthoformate | 0.05 | 193.6 | 5.83 |
| II | triethyl orthoformate | 0.05 | 171.2 | 6.03 |
| III | tri-n-butyl orthoformate | 0.05 | 232.0 | 5.53 |
| IV | triethyl thiophosphate | 0.06 | 210.8 | 4.90 |
| V | tri-n-butyl thiophosphate | 0.06 | 243.6 | 6.93 |
| VI | tri-iso-octyl thiophosphate | 0.06 | 256.8 | 7.10 |
| VII | tri-p-tolyl thiophosphate | 0.06 | 231.2 | 5.86 |
| VIII | dimethyl-, p-nitrophenyl thiophosphate | 0.06 | 205.2 | 6.02 |
| IX | tri-n-butyl borate | 0.06 | 312.0 | 6.30 |

EXAMPLES X-XVIII

Using a polymerization technique similar to that described in Examples I-IX, propylene was polymerized using a catalyst system containing additives of this invention in combination with other additives. The major catalyst components were 0.2 grams AA TiCl$_3$ and either 3.2 milliliters of DEAC or a mixture of 1.1 milliliters of ethyl aluminum dichloride (EADC) and 0.2 milliliters of TEA. The additives of this invention were triethyl thiophosphate (TETP) and tri-n-butyl borate (TBB). The other additives were bis (tri-n-butyltin) sulfide (BTS), 2,6-lutidine N-oxide (LNO) and 2,4-lutidine (LN). The results are shown in TABLE II.

TABLE II

| Example | Aluminum Alkyl | Additive Type | Additive Amount (ml) | Other Additive Type | Other Additive Amount (ml) | Crystalline Yield (g/g TiCl$_3$) | Hexane Solubles (%) |
|---|---|---|---|---|---|---|---|
| X | DEAC | TETP | 0.03 | BTS | 0.03 | 202.4 | 1.58 |
| XI | DEAC | TETP | 0.03 | BTS | 0.03 | 179.6 | 1.53 |
|   |   |   |   | LNO | 0.03 |   |   |
| XII(*) | TEA-EADC | TETP | 0.03 | BTS | 0.015 | 177.2 | 2.03 |
|   |   |   |   | LNO | 0.04 |   |   |
| XIII(*) | TEA-EADC | TETP | 0.03 | BTS | 0.015 | 247.6 | 1.35 |
|   |   |   |   | LNO | 0.03 |   |   |
| XIV | TEA-EADC | TETP | 0.03 | BTS | 0.015 | 197.6 | 2.78 |
|   |   |   |   | LNO | 0.03 |   |   |
| XV(*) | TEA-EADC | TETP | 0.03 | BTS | 0.02 | 180.8 | 1.95 |
|   |   |   |   | LNO | 0.05 |   |   |
| XVI | DEAC | TBB | 0.06 | LNO | 0.06 | 174.4 | 2.57 |
| XVII(*) | DEAC | TBB | 0.06 | LNO | 0.03 | 219.6 | 2.94 |
| XVIII | TEA-EADC | TBB | 0.06 | LNO | 0.03 | 106.4 | 2.92 |

(*)Aluminum alkyl-additives mixture was aged for one hour prior to addition of TiCl$_3$.

EXAMPLES XIX-XXI

A series of bulk propylene polymerization were carried out using as catalyst additives triethylthiophosphate (TETP) in conjunction with tributylphosphite (TBP) and triphenylantimony oxide (TPAO).

Polymerization was initiated AA TiCl$_3$, DEAC and catalyst additives were placed in a one-liter Parr reactor, polymerization was initiated by introducing 460 p.s.i.g. of propylene and 3.5 p.s.i.g. of hydrogen. Polymerization at 160° F. proceeded for two hours, after which time the polymeric product was deactivated and recovered.

The results tabulated in Table II shows that TETP is an effective catalyst additive which reduces Hot Hexane Solubles while maintaining Crystalline Activity. Hot Hexane Solubles were determined by extracting a ten-gram sample of product by 200 milliliters of hexane at 70° C. for two hours.

TABLE III

| Example (Run) | Catalyst System | Molar Ratio | Crystalline Yield (g/g TiCl$_3$) | Hot Hexane Solubles (%) |
|---|---|---|---|---|
| (B) | DEAC/TiCl$_3$ | 2.75/1 | 2372 | 4.3 |
| (C) | DEAC/TiCl$_3$ | 5.5/1 | 3224 | 5.6 |
| (D) | DEAC/TiCl$_3$/TBP | 5.5/1/0.228 | 3380 | 3.6 |
| XIX | DEAC/TiCl$_3$/TETP/TBP | 5.5/1/0.336/.228 | 3016 | 1.8 |
| XX | DEAC/TiCl$_3$/TETP | 5.5/1/0.336 | 3346 | 1.2 |
| XXI | DEAC/TiCl$_3$/TPAO/TETP | 5.5/1/0.17/0.336 | 2636 | 0.8 |

EXAMPLES XXII-XXXVII

In a manner similar to that described in Examples XIX to XXI, a series of bulk propylene polymerization were performed using 1.2 milliliters of DEAC (25% in hexane), 0.05 grams of AA TiCl$_3$ and a measured amount of additives. The propylene and hydrogen pressures at 460 and 4 p.s.i.g. respectively were maintained for two hours at a temperature of 160° F. The results are shown in Table IV.

TABLE IV

| Example (Run) | Triethyl-thiophosphate (ml) | Coadditive (ml) | Crystalline Yield (g/g TiCl$_3$) | Hot Hexane Solubles (%) |
|---|---|---|---|---|
| (E) | — | — | 3420 | 6.3 |
| XXII | 0.04 | — | 2619 | 1.9 |
| XXIII | 0.02 | — | 2919 | 2.2 |
| XXIV | 0.01 | — | 3111 | 2.3 |
| XXV[1] | 0.03 | — | 2262 | 1.6 |
| XXVI[2] | 0.02 | — | 3201 | 3.3 |
| XXVII | 0.03 | DMTHF (0.02) | 2936 | 1.7 |
| XXVIII | 0.02 | DMTHF (0.02) | 2911 | 3.0 |
| XXIX | 0.02 | DMTHF (0.02) | 3055 | 3.7 |
| XXX | 0.02 | 2,4,6-Collidine (0.01) | 1558 | 1.0 |
| XXXI | 0.04 | 2,4,6-Collidine (0.01) | 1502 | 1.9 |
| XXXII | 0.025 | 2,4,6-Collidine (0.005) | 2881 | 2.1 |
| XXXIII | 0.02 | BTS (0.02) | 2657 | 2.0 |
| XXXIV | 0.02 | THOS (0.02) | 2854 | 3.3 |
| XXXV | 0.02 | THOS (0.04) | 2547 | 11.1 |
| XXXVI | 0.02 | TDPS (0.02) | 2190 | 2.2 |
| XXXVII | 0.025 | TBA (0.05) | 3002 | 3.6 |

[1]Aluminum alkyl was 4/6 (v/v) mixture of TEA and ethyl aluminum dichloride
[2]Catalyst included 0.02 ml TEA
Abbreviations:
DMTHF = 2,5-dimethyltetrahydrofuran
BTS = bis(tri-n-butyltin)sulfide
THOS = tetra-n-hexylorthosilicate
TDPS = tris-(dimethylamino)phosphoryl sulfide
TBA = tri-n-butylamine The data in the Examples shows that the addition of alkyl esters of thiophosphoric, orthoformic and boric acids into an alpha-olefin system reduces the n-hexane-soluble product without substantially decreasing the overall polymerization activity.

We claim:

1. In a process to polymerize alpha-olefins to normally-solid, substantially crystalline polymer utilizing a catalyst comprising a titanium halide and an aluminum alkyl, the improvement comprising adding to such catalyst effective amounts of an additive selected from the group consisting of aliphatic and aromatic esters of orthoformic and thiophosphoric acids wherein the aliphatic and aromatic groups are hydrocarbons or substituted hydrocarbons containing from 1 to about 12 carbon atoms, whereby the amount of n-hexane soluble polymeric product is decreased.

2. The improvement of claim 1 wherein the alpha-olefin is propylene or a mixture of propylene and ethylene.

3. The improvement of claim 2 wherein the titanium halide is a titanium trichloride.

4. The improvement of claim 3 wherein the aluminum alkyl is diethylaluminum chloride, triethylaluminum or a mixture thereof.

5. The improvement of claim 4 wherein the additive is an alkyl ester of orthoformic acid.

6. The improvement of claim 4 wherein the additive is an alkyl ester of thiophosphoric acid.

7. The improvement of claim 5 wherein the additive is trimethylorthoformate, triethylorthoformate or tri-n-butylorthoformate.

8. The improvement of claim 6 wherein the additive is triethylthiophosphate, tri-n-butylthiophosphate, tri-isooctylthiophosphate or tri-p-tolylthiophosphate.

* * * * *